(12) United States Patent
Zhamu et al.

(10) Patent No.: US 8,158,282 B2
(45) Date of Patent: Apr. 17, 2012

(54) METHOD OF PRODUCING PRELITHIATED ANODES FOR SECONDARY LITHIUM ION BATTERIES

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 825 days.

(21) Appl. No.: 12/291,689

(22) Filed: Nov. 13, 2008

(65) Prior Publication Data
US 2010/0120179 A1    May 13, 2010

(51) Int. Cl.
*H01L 21/00* (2006.01)
*H01M 4/04* (2006.01)

(52) U.S. Cl. ... 429/231; 429/232; 438/19; 257/E21.001; 264/115

(58) Field of Classification Search .................. 429/231, 429/232; 438/19; 257/E21.001; 264/115
See application file for complete search history.

(56) References Cited

U.S. PATENT DOCUMENTS

| | | | |
|---|---|---|---|
| 4,980,250 A | 12/1990 | Takahashi et al. | |
| 5,436,093 A | 7/1995 | Huang et al. | |
| 5,543,021 A * | 8/1996 | Yazami et al. | 204/294 |
| 5,595,837 A * | 1/1997 | Olsen et al. | 429/224 |
| 5,601,951 A | 2/1997 | Johnson et al. | |
| 5,635,151 A | 6/1997 | Zhang et al. | |
| 5,721,067 A | 2/1998 | Jacobs et al. | |
| 5,908,715 A | 6/1999 | Liu et al. | |
| 6,007,945 A | 12/1999 | Jacobs et al. | |
| 6,025,093 A | 2/2000 | Herr | |
| 6,143,448 A | 11/2000 | Fauteux et al. | |
| 6,316,143 B1 | 11/2001 | Foster et al. | |
| 6,335,115 B1 | 1/2002 | Meissner | |
| 6,524,744 B1 | 2/2003 | Clerc et al. | |
| 6,706,447 B2 | 3/2004 | Gao et al. | |
| 7,094,499 B1 | 8/2006 | Hung | |
| 7,276,314 B2 | 10/2007 | Gao et al. | |
| 2005/0130043 A1 | 6/2005 | Gao et al. | |
| 2006/0237697 A1 | 10/2006 | Kosuzu et al. | |
| 2006/0263689 A1 | 11/2006 | Ishihara et al. | |
| 2007/0020519 A1 | 1/2007 | Kim et al. | |
| 2007/0031730 A1 | 2/2007 | Kawakami et al. | |
| 2007/0122701 A1 | 5/2007 | Yamaguchi | |
| 2007/0148544 A1 | 6/2007 | Le | |
| 2010/0173198 A1 * | 7/2010 | Zhamu et al. | 429/222 |

OTHER PUBLICATIONS

T. Umeno, et al., "Novel Anode Material for Lithium-Ion Batteries: Carbon-coated Silicon Prepared by Thermal Vapor Decomposition," Chemistry Letters, (2001) pp. 1186-1187.
M. Yoshio, et al., "Carbon-Coated Si as a Lithium-Ion Battery Anode Material," J. of the Electrochem. Soc., 149 (12) (2002) A1598-A1603.

(Continued)

*Primary Examiner* — Timothy Vanoy (57) ABSTRACT

A method of producing a lithium-ion battery anode comprising: (a) providing an anode active material; (b) intercalating or absorbing a desired amount of lithium into this anode active material to produce a prelithiated anode active material; (c) comminuting the prelithiated anode active material into fine particles with an average size less than 10 μm (preferably sub-micron and more preferably <200 nm); and (d) combining multiple fine particles of prelithiated anode active material with a conductive additive and/or a binder material to form the anode. The battery featuring such an anode exhibits an exceptionally high specific capacity, an excellent reversible capacity, and a long cycle life.

19 Claims, 4 Drawing Sheets

OTHER PUBLICATIONS

N. Dimov, et al., "Characterization of Carbon-Coated Silicon Structural Evolution and Possible Limitations," J. Power Source, 114 (2003) 88-95.

N. Dimov, et al., "Carbon-coated Silicon as Anode Material for Lithium Ion Batteries: Advantages and Limitations," Electrochimica Acta, 48 (2003) 1579-1587.

Z. S. Wen, et al., "High Capacity Silicon/Carbon Composite Anode Materials for Lithium Ion Batteries," Electrochemistry Communications, 5 (2003) 165-168.

C. K. Chan, et al., "High-Performance Lithium Battery Anodes Using Silicon Nanowires," Nature Nanotechnology, 3 (Jan. 2008) 31-35.

* cited by examiner

METHOD OF PRODUCING PRELITHIATED ANODES FOR SECONDARY LITHIUM ION BATTERIES

FIELD OF THE INVENTION

The present invention provides a method of producing an anode for a secondary battery, particularly a rechargeable lithium-ion battery that comprises an anode containing a prelithiated anode active material.

BACKGROUND

The following list of references is closely related to the prior art. These references will be cited from time to time in the specification. They will be indicated as [Ref. xx] or simply [xx], where xx denotes a numeral.

List of References
1. J. Zhang, et al., "Carbon Electrode Materials for Lithium Battery Cells and Method of Making Same," U.S. Pat. No. 5,635,151 (Jun. 3, 1997).
2. Q. Liu, et al., "Composite Carbon Materials for Lithium Ion Batteries, and Method of Producing Same," U.S. Pat. No. 5,908,715 (Jun. 1, 1999).
3. J. K. Jacobs, et al, "Negative electrode for a rechargeable lithium battery comprising a solid solution of titanium dioxide and tin dioxide," U.S. Pat. No. 6,007,945 (Dec. 28, 1999).
4. D. G. Fauteux, et al., "Electrode materials having carbon particles with nano-sized inclusions therewithin and an associated electrolytic and fabrication process," U.S. Pat. No. 6,143,448 (Nov. 7, 2000).
5. C. C. Hung, "Carbon Materials Metal/Metal Oxide Nanoparticle Composite and Battery Anode Composed of the Same", U.S. Pat. No. 7,094,499 (Aug. 22, 2006).
6. D. Clerc, et al., "Multiphase Material and Electrodes Made Therefrom," U.S. Pat. No. 6,524,744 (Feb. 25, 2003).
7. D. L. Foster, et al, "Electrode for Rechargeable Lithium-Ion Battery and Method for Fabrication," U.S. Pat. No. 6,316,143 (Nov. 13, 2001).
8. D. B. Le, "Silicon-Containing Alloys Useful as Electrodes for Lithium-Ion Batteries," US 2007/0148544 (Pub. Jun. 28, 2007).
9. H. Yamaguchi, "Anode Material, Anode and Battery," US 2007/0122701 (Pub. May 31, 2007).
10. S. Kawakami, et al., "Electrode Material for Anode of Rechargeable Lithium Battery," US 2007/0031730 (Pub. Feb. 8, 2007).
11. H. Kim, et al., "Anode Active Material, Manufacturing Method Thereof, and Lithium Battery Using the Anode Active Material," US 2007/0020519 (Pub. Jan. 25, 2007).
12. H. Ishihara, "Anode Active Material and Battery," US 2006/0263689 (Pub. Nov. 23, 2006).
13. T. Kosuzu, et al., "Electrode Material for Rechargeable Lithium Battery," US 2006/0237697 (Pub. Oct. 26, 2006).
14. T. Umeno, et al., "Novel Anode Material for Lithium-Ion Batteries: Carbon-coated Silicon Prepared by Thermal Vapor Decomposition," Chemistry Letters, (2001) pp. 1186-1187.
15. M. Yoshio, et al., "Carbon-Coated Si as a Lithium-Ion Battery Anode Material," J. of the Electrochem. Soc., 149 (12) (2002) A1598-A1603.
16. N. Dimov, et al., "Characterization of Carbon-Coated Silicon Structural Evolution and Possible Limitations," J. Power Source, 114 (2003) 88-95.
17. N. Dimov, et al., "Carbon-coated Silicon as Anode Material for Lithium Ion Batteries: Advantages and Limitations," Electrochimica Acta, 48 (2003) 1579-1587.
18. Z. S. Wen, et al., "High Capacity Silicon/Carbon Composite Anode Materials for Lithium Ion Batteries," Electrochemistry Communications, 5 (2003) 165-168.
19. C. K. Chan, et al., "High-Performance Lithium Battery Anodes Using Silicon Nanowires," Nature Nanotechnology, 3 (January 2008) 31-35.
20. Y. Takahashi, et al., "Secondary Battery," U.S. Pat. No. 4,980,250, Dec. 25, 1990.
21. C. K. Huang, et al., "Method for Fabricating Carbon/Lithium Ion Electrode for Rechargeable Lithium Cell," U.S. Pat. No. 5,436,093, Jul. 25, 1995.
22. J. K. Jacobs, et al., "Rechargeable Lithium Battery Having Improved Reversible Capacity," U.S. Pat. No. 5,721,067 (Feb. 24, 1998).
23. E. Meissner, "Secondary Lithium-ion Cell with an Auxiliary Electrode," U.S. Pat. No. 6,335,115 (Jan. 1, 2002).
24. A. P. Johnson, et al., "Rechargeable Lithium Ion Cell," U.S. Pat. No. 5,601,951, (Feb. 11, 1997).
25. R. Herr, "Lithium Ion Cell," U.S. Pat. No. 6,025,093 (Feb. 15, 2000).
26. Y. Gao, et al., "Lithium Metal Dispersion in Secondary Battery Anode," U.S. Pat. No. 6,706,447, Mar. 16, 2004 and U.S. Pat. No. 7,276,314 (Oct. 2, 2007).
27. Y. Gao, et al. "Lithium metal dispersion in electrodes," US Patent Application Pub. No. 2005/0130043 (Jun. 16, 2005).

Concerns over the safety of earlier lithium secondary batteries led to the development of lithium ion secondary batteries, in which pure lithium metal sheet or film was replaced by carbonaceous materials as the negative electrode (anode). The carbonaceous material may comprise primarily graphite that is intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g [Ref. 1].

In addition to carbon- or graphite-based anode materials, other inorganic materials that have been evaluated for potential anode applications include metal oxides, metal nitrides, metal sulfides, and a range of metals, metal alloys, and inter-metallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode active materials has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). An anode active material is normally used in a powder form, which is mixed with conductive additives and bonded by a binder resin. The binder also serves to bond the mixture to a current collector. Alternatively, an anode active material may be coated as a thin film onto a current collector. On repeated charge and discharge operations, the alloy particles tend to undergo pulverization and the current collector-supported thin films are prone to fragmentation due to expansion and contraction of the anode active material during the insertion and extraction of lithium ions. This pulverization or fragmentation results in loss of particle-to-particle contacts between the active material and the conductive additive or contacts between the anode material and its current collector. These adverse effects result in a significantly shortened charge-discharge cycle life [1].

To overcome the problems associated with such mechanical degradation, several approaches have been proposed [e.g., Refs. 2-18], including (a) using nano-scaled particles of an anode active material, (b) composites composed of small electrochemically active particles supported by less active or non-active matrices or coatings, and (c) metal alloying. Examples of more promising active particles are Si, Sn, and $SnO_2$. For instance, Umeno, et al. [Ref. 14-17] proposed an anode based on carbon-coated silicon prepared by thermal vapor decomposition. Although a specific capacity as high as 800-1,450 mAh/g was achieved, the capacity faded rapidly after 40 cycles. Hung [5] disclosed a method of forming a composite anode material. The steps include selecting a carbon material as a constituent part of the composite, chemically treating the selected carbon material to receive nanoparticles, incorporating nanoparticles into the chemically treated carbon material, and removing surface nanoparticles from an outside surface of the carbon material with incorporated nanoparticles. A material making up the nanoparticles alloys with lithium. The resulting carbon/nanoparticle composite anodes did not exhibit any significant increase in capacity, mostly lower than 400 mAh/g. In fact, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

The positive electrode (cathode) active material is typically selected from a broad array of lithium-containing or lithium-accommodating oxides, such as lithium manganese dioxide, lithium manganese composite oxide, lithium nickel oxide, lithium cobalt oxide, lithium nickel cobalt oxide, lithium vanadium oxide, and lithium iron phosphate. The cathode active material may also be selected from chalcogen compounds, such as titanium disulfate or molybdenum disulfate. These prior art materials do not offer a high lithium insertion capacity and this capacity also tends to decay rapidly upon repeated charging and discharging. A practical specific capacity of a cathode material has been, at the most, up to 200 mAh/g of the cathode active material, which rapidly decays as the charge-discharge cycling operation proceeds. In many cases, this capacity fading may be ascribed to particle pulverization or thin film fragmentation (analogous to the case of an anode material), resulting in a loss of electrical contact of the cathode active material particles with the cathode current collector. Since the cathode specific capacity is relatively low, there is a strong desire to make use of a cathode active material to its full capacity.

As a lithium-ion cell is charged and discharged, lithium is alternately stored in the cathode and in the anode, so that the total amount of cyclable charge corresponds to the amount of lithium shuttling back and forth between the two electrodes. When the cell is assembled, usually an amount of cathode active material is made to store the amount of lithium available for the subsequent cyclic operation. This selection of cathode, instead of anode, to pre-store the needed lithium was mainly due to the notion that cathode active materials, such as lithium cobalt oxide, are relatively stable in ambient air (e.g., against oxidation) compared to lithiated graphite. However, the notion that this amount of lithium that determines the battery capacity is totally supplied from the cathode, limits the choice of cathode active materials because the active materials must contain removable lithium. Also, delithiated products corresponding to $LiCoO_2$ and $LiNiO_2$ formed during charging (e.g. $Li_xCoO_2$ and $Li_xNiO_2$ where $0.4<x<1.0$) and overcharging (i.e. $Li_xCoO_2$ and $Li_xNiO_2$ where $x<0.4$) are not stable [26]. In particular, these delithiated products tend to react with the electrolyte and generate heat, which raises safety concerns.

When the lithium-ion cell is assembled and filled with electrolyte, the anode and cathode active materials have a difference in potential of at most about 2 volts between each other. The difference in potential between the two electrodes, after the lithium-ion cell has been charged, is about 4 volts. When the lithium-ion cell is charged for the first time, lithium is extracted from the cathode and introduced into the anode. As a result, the anode potential is lowered significantly (toward the potential of metallic lithium), and the cathode potential is further increased (to become even more positive). These changes in potential may give rise to parasitic reactions on both electrodes, but more severely on the anode. For example, a decomposition product known as solid electrolyte interface (SEI) readily forms on the surfaces of carbon anodes, wherein the SEI layer comprises lithium and electrolyte components. These surface layers or covering layers are lithium-ion conductors which establish an ionic connection between the anode and the electrolyte and prevent the reactions from proceeding any further.

Formation of this SEI layer is therefore necessary for the stability of the half-cell system comprising the anode and the electrolyte. However, as the SEI layer is formed, a portion of the lithium introduced into the cells via the cathode is irreversibly bound and thus removed from cyclic operation, i.e. from the capacity available to the user. This means that, during the course of the first discharge, not as much lithium moves from the anode to the cathode as had previously been released to the anode during the first charging operation. This phenomenon is called irreversible capacity and is known to consume about 10% to 20% of the capacity of a lithium ion cell.

A further drawback is that the formation of the SEI layer on the anode after the first charging operation may be incomplete and will continue to progress during the subsequent charging and discharge cycles [26]. Even though this process becomes less pronounced with an increasing number of repeated charging and discharge cycles, it still causes continuous abstraction, from the system, of lithium which is no longer available for cyclic operation and thus for the capacity of the cell. Additionally, as indicated earlier, the formation of a solid-electrolyte interface layer consumes about 10% to 20% of the amount of lithium originally stored at the cathode, which is already low in capacity (typically <200 mAh/g). Clearly, it would be a significant advantage if the cells do not require the cathode to supply the required amount of lithium.

Takahashi, et al [20], Huang, et al [21], and Jacobs, et al [22] disclosed methods by means of which lithium is introduced into the anode active material in order to minimize the lithium consumption and thus the irreversible capacity loss. However, prelithiated carbon- or graphite-based anode active materials lead to electrodes which can be handled only under non-oxidizing and dry conditions, making practical production of lithium ion batteries difficult.

Meissner [23] disclosed a secondary lithium-ion cell which includes a lithium-intercalating, carbon-containing anode, a non-aqueous lithium ion-conducting electrolyte, and a lithium-intercalating cathode including a lithium-containing chalcogen compound of a transition metal, and a lithium-containing auxiliary electrode disposed in the cell to compensate for the irreversible capacity loss in the secondary lithium-ion cell. This auxiliary electrode is spatially separated from the electrolyte when the cell is positioned in a first orientation and contacts the electrolyte when the cell is oriented in a second position, for supplying additional lithium to the cell. Such an additional electrode makes the battery very complicated and difficult to make. Switching between two orientations is not a good strategy since it would complicate the handling of the battery and an average consumer would not pay attention to such a detail to ensure proper operation of such a battery.

The approach of using a sacrificial electrode, in addition to an anode and a cathode in a cell, was also proposed earlier by Johnson, et al. [24] and by Herr [25]. Again, this additional electrode further complicates the manufacture and operation of a resulting battery. The assembling operation of a battery containing a highly reactive lithium metal or alloy electrode must be handled in an oxygen-free and moisture-free environment.

Gao, et al. [26] disclosed a secondary battery containing an anode that is formed of a host material capable of absorbing and desorbing lithium in an electrochemical system and lithium metal dispersed in the host material. The lithium metal is a finely divided lithium powder and preferably has a mean particle size of less than about 20 microns. The host material comprises one or more materials selected from the group consisting of carbonaceous materials (e.g., graphite), Si, Sn, tin oxides, composite tin alloys, transition metal oxides, lithium metal nitrides and lithium metal oxides. The method of preparing such an anode includes the steps of providing a host material, dispersing lithium metal in the host material, and then forming the host material and the lithium metal dispersed therein into an anode. The lithium metal and the host material is mixed together with a non-aqueous liquid to produce a slurry and then applied to a current collector and dried to form the anode. Alternatively, the anode can be formed by chemical means by immersing the host material in a suspension of lithium metal in a non-aqueous liquid, and then formed into an anode. The approach of Gao, et al [26] has the following drawbacks:

(1) The anode is composed of an anode active material (e.g., graphite or Sn particles) and a discrete lithium metal phase (fine Li metal powder particles) forming a mixture of two types of particles. This implies that the anode still contains highly active lithium particles that are sensitive to oxygen and moisture and must be handled under very stringent conditions.

(2) The amount of lithium metal present in the anode is prescribed to be no more than the maximum amount sufficient to intercalate in, alloy with, or be absorbed by the host material in the anode. For example, if the host material is carbon, the amount of lithium is no more than the amount needed to make $LiC_6$. This implies that the amount of lithium needed for the SEI formation was not considered and, hence, the resulting battery will suffer a capacity loss of 10%-20% after the first cycle.

(3) It is of significance to note that although Gao, et al [26] mentioned in passing that the anode active material can be a mixture of carbon, Sn, Si, etc, the mixture still further contains lithium metal powder particles as an additional, discrete phase that is un-protected. The resulting multi-component, multi-phase mixture is still sensitive to the presence of oxygen and water contents in the air, thus significantly complicating the battery manufacturing operations.

(4) In a follow-on patent application, Gao, et al. [27] suggested methods of lithiating an electrode prior to combining electrodes and other components to form a battery. In all cases, the electrode is composed of a mixture of discrete lithium metal particles or wire screen and powder particles of a host material, the latter being partially litiated. As shown in FIG. 1 of Gao, et al [27], the anode comprises discrete lithium metal particles and a host material. Both the discrete lithium metal particles and lithiated carbonaceous material (graphite) are unstable in an oxygen- or moisture-containing environment.

Furthermore, Gao, et al. [26,27] have not fairly suggested how other anode active materials than graphite can be prelithiated in a controlled manner (e.g., without inducing a lithium coating on the surface of active material particles). In fact, no example was given to illustrate if or how other important anode active materials can be successfully prelithiated prior to battery production. No battery testing or electrochemical performance evaluation data was given in any of Gao's patents [26] or patent application [27] to demonstrate the advantages of their electrodes.

Therefore, there exists an urgent need for a secondary lithium ion battery that has one or more of the following features or advantages:

a) The battery does not contain a sacrificial electrode or an extra electrode in addition to an anode and cathode in a cell;

b) The battery comprises an anode that does not contain a discrete lithium metal phase or lithium metal powder particles dispersed in the anode;

c) The battery contains an anode that comprises at least two types of anode active material wherein at least one type of active material is prelithiated (e.g., Si and Sn) and at least one type of active material is not prelithiated (e.g., carbonaceous material, such as graphite, hard carbon, soft carbon, surface-modified graphite, chemically modified graphite, or meso-carbon micro-beads, MCMBs). Prelithiated carbonaceous anode materials are unstable in regular room air;

d) The battery contains an anode that comprises at least a non-carbon active material possessing an ultra-high lithium absorbing capacity (e.g., Si that exhibits a specific capacity up to 4,200 mAh/g);

e) The battery comprises an anode that contains an excess amount of lithium (disposed inside a non-carbon anode active material, not on its surface) to compensate for the formation of SEI layers, in addition to providing enough lithium to intercalate into (or form a compound with) a cathode active material.

f) The battery features a long and stable cycle life due to an anode that comprises fine, prelithiated active particles capable of maintaining their integrity and their contact with the conductive additive and the current collector. No further particle pulverization takes place since they have been pre-pulverized.

Therefore, a need exists for an anode active material that has a high specific capacity, a minimal irreversible capacity (or a low decay rate), and a long cycle life. In order to accomplish these goals, we have worked diligently and intensively on the development of new electrode materials. These research and development efforts lead to the present patent application.

SUMMARY OF THE INVENTION

The present invention provides a method of producing an anode for a lithium-ion battery that exhibits a significantly improved specific capacity and much longer charge-discharge cycle life. The method comprises (a) providing an anode active material (preferably in the form of fine powder or thin film); (b) intercalating or absorbing a desired amount of lithium into the anode active material to produce a prelithiated anode active material; (c) comminuting the prelithiated anode active material into fine particles with an average size less than 10 μm (preferably <1 μm and most preferably <200 nm); and (d) combining multiple fine particles of the prelithiated anode active material with a conductive additive and/or a binder material to form the anode.

The anode active material may be selected from the following groups of materials:

(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 μm, more preferably thinner than 1 μm, and most preferably thinner than 100 nm;

(b) The alloys or intermetallic compounds of Si, Ge, Sn, Pb, Sb, Bi, Zn, Al, or Cd, stoichiometric or non-stoichiometric with other elements; and (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

Lithiation of an anode active material (e.g., Si particles or thin film) in a prior art lithium ion battery during the charging operation is known to induce a volume change to the anode active material up to 300-400% of its original dimension. Such highly dilated particles or thin film are extremely brittle and prone to pulverization or fragmentation. During repeated charge/discharge cycles, the anode active material tends to quickly become pulverized and the resulting fragments lose contacts with the conductive additive and the current collector. Those fragments are no longer active in providing electrons to the external circuit.

The presently invented method makes use of the notion that highly lithiated anode active material is very brittle and can be readily pulverized. The present invention has turned this drawback into an advantage. The presently invented approach entails prelithiating the anode active material to the extent that the prelithiated material becomes readily pulverizable into nano-scaled particles. The approach includes pre-pulverizing the prelithiated material into ultra-fine particles prior to incorporating these particles into an anode. The results have been most surprising in several aspects:

(a) We have surprisingly found that prelithiated materials can be much more readily converted into nano-scaled particles as compared to their non-lithiated counterparts. It is well known in the art that the preparation of nano materials has been usually slow and expensive. Prelithiation makes such a process much faster and less expensive. Nano particles also mean a shorter distance for lithium ions to penetrate in and out of the particles, resulting in a better rate capacity for the battery. In other words, the electrode can quickly store or release lithium and, hence, the battery can be discharged or re-charged rapidly. This is a highly beneficial feature for a battery that is intended for electric vehicle applications, where a fast discharge rate capability (e.g., during acceleration) is required. In all battery applications, a fast re-charge rate is clearly a highly desirable feature. A driver can quickly recharge a car battery in a matter of 10 to 60 minutes instead of several hours.

(b) Pre-pulverized, prelithiated particles, particularly those at the nano scales, are no longer brittle and, for the most part, no longer pulverizable in an anode when the battery undergoes repeated charges and recharges. The issue of having undesired particle pulverization goes away.

Figure 2A:
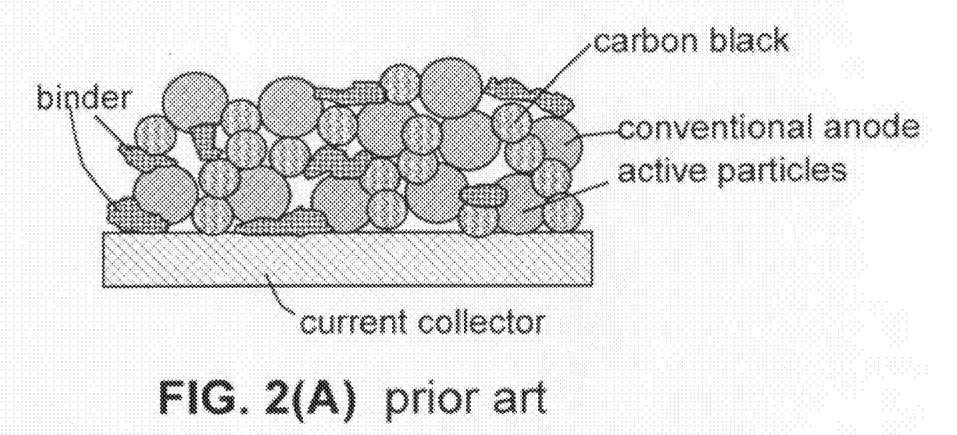

(c) Even though prelithiated particles could shrink in volume during the discharge process when lithium is extracted out of the anode active material, we have further surprisingly found that shrinking of prelithiated and pre-pulverized particles did not lead to loss of contacts with conductive additives (e.g., carbon black or fine graphite particles) and the current collector during the charge and discharge cycles. Hence, the anode maintains a high capacity for a much longer cycle life. In contrast, in the conventional Li-ion battery electrodes (e.g., schematically shown in FIG. 2(A)), although conductive additives could form a condition of percolation where the particles contact one another to form a network of electron-conducting paths, they are easily broken when the electro-active particles expand or shrink during the Li ion insertion or extraction steps.

Figure 2B:
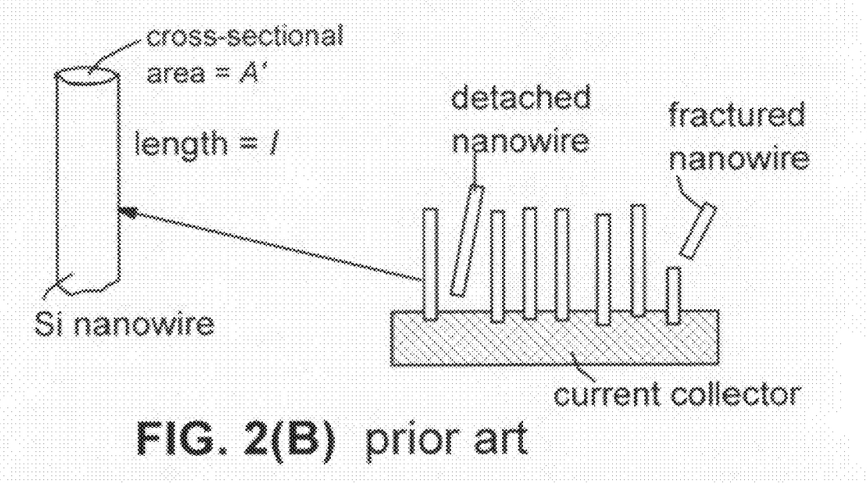

(d) Chan, et al [Ref. 19] proposed an anode active material, where multiple Si nanowires were catalytically grown from an anode current collector surface in a substantially perpendicular direction (FIG. 2(B)). There are severe drawbacks associated with these prior art end-connected nanowire-based electrodes. For instance, each Si nanowire is only connected to a current collector through a very narrow contact area (diameter=89 nm) and, hence, the nanowire would tend to detach from the steel current collector after a few volume expansion-contraction cycles. Furthermore, if fragmentation of a nanowire occurs, only the segment remaining in direct contact with the current collector (e.g., steel plate in Chan, et al.) could remain in electronic connection with the current collector and all other segments will become ineffective since the electrons generated will not be utilized. Additionally, the parallel nanowire configuration is not compatible with the current battery production practice, which typically involves high-speed winding and packaging of multiple layers of electrodes and separator. In contrast, the instant invention does not require a change in the battery production equipment or procedure.

These and other advantages and features of the present invention will become more transparent with the description of the following best mode practice and illustrative examples. The present invention also provides a method of producing a lithium-ion battery; the method comprising (A) preparing an anode using the aforementioned method; and (B) combining the anode with a cathode, separator, and electrolyte to form the battery. Generally speaking, the invention offers a method of producing a superb lithium-ion battery. The method comprises (A) preparing an anode from pre-lithiated and pre-pulverized particles; and (B) combining this anode with a cathode, separator, and electrolyte to form the battery.

BRIEF DESCRIPTION OF THE DRAWINGS

FIG. 1 (A) Flow chart of a prior art process for preparing a lithium ion battery anode; and (B) Flow chart of an innovative method of producing an anode.

FIG. 2 (A) Schematic of a prior art electrode where electro-active particles, conductive additive particles (e.g., carbon black or fine graphite powder), and a binder material are randomly mixed together; and (B) Schematic of a prior art anode composition composed of Si nanowires catalytically grown in a direction normal to a steel current collector according to Chan, et al. [Ref 19].

DETAILED DESCRIPTION OF PREFERRED EMBODIMENTS

This invention is related to anode materials for high-capacity lithium batteries, which are preferably secondary batteries based on a non-aqueous electrolyte or a polymer gel electrolyte. The shape of a lithium metal or lithium ion battery can be cylindrical, square, button-like, etc. The present invention is not limited to any battery shape or configuration.

The present invention provides a method of producing an anode for a rechargeable lithium-ion battery that exhibits a significantly improved specific capacity and much longer charge-discharge cycle life. The method comprises (a) providing an anode active material (preferably in the form of fine powder or thin film); (b) intercalating or absorbing a desired amount of lithium into the anode active material to produce a prelithiated anode active material; (c) comminuting the prelithiated anode active material into fine particles with an average size less than 10 µm (preferably <1 µm and most preferably <200 nm); and (d) combining multiple fine particles of the prelithiated anode active material with a conductive additive and/or a binder material to form the anode. The starting anode active material in the form of a fine powder preferably has an average diameter less than 10 µm. If in a thin-film or plate form, the anode active material preferably has a thickness less than 10 µm.

Figure 1A:
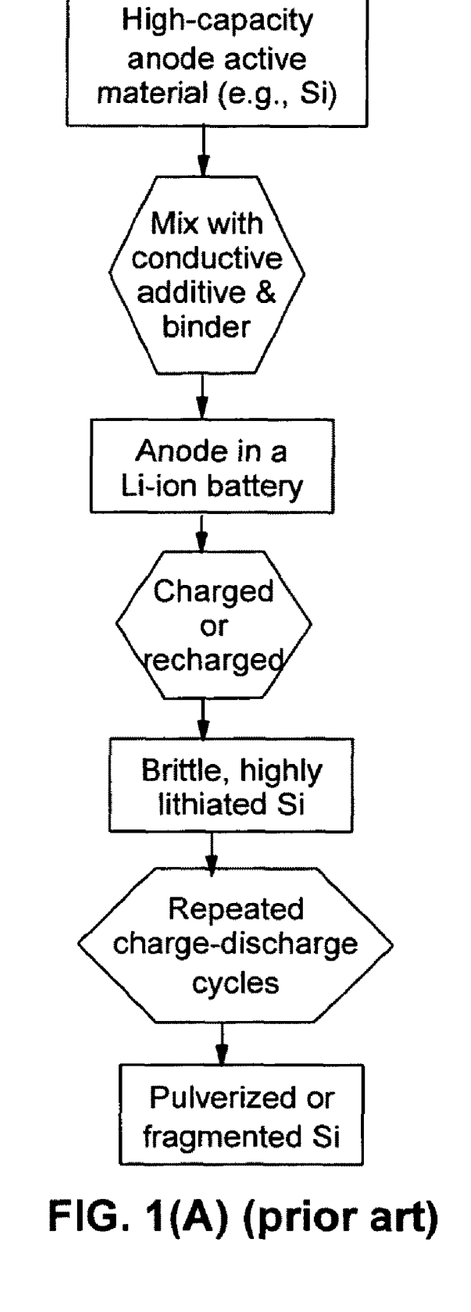

As summarized in FIG. 1(A), in a conventional Li-ion battery, lithiation of an anode active material (e.g., Si particles) during the charging operation is known to induce a volume change in the anode active material by 300-400% of its original dimension. Such highly dilated particles are extremely brittle and prone to pulverization or fragmentation. During the repeated charge/discharge cycles, the anode active material tends to quickly become pulverized and the resulting fragments lose contacts with the conductive additive and the current collector. Those fragments are no longer active in providing electrons to the external circuit.

Figure 1B:
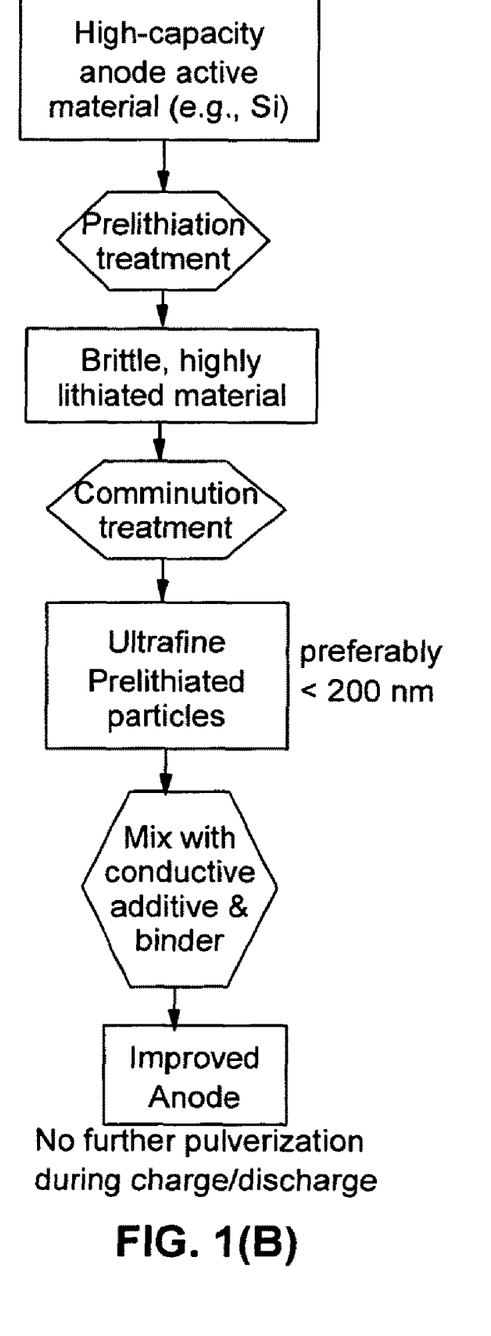

The presently invented approach (schematically shown in FIG. 1(B)) makes use of the notion that highly lithiated anode active material is very brittle and can be readily pulverized. The present approach turns this drawback into an advantage by (i) prelithiating the anode active material to the extent that the prelithiated material becomes readily pulverizable; and (ii) pre-pulverizing the prelithiated material into ultrafine particles prior to incorporating these particles into an anode. We have surprisingly found that pre-pulverized, prelithiated particles that are already smaller than 1 µm in size (particularly if less than 200 nm) are no longer brittle and, for the most part, no longer pulverizable in an anode when the battery undergoes repeated charges and recharges. The issue of having undesired particle pulverization in the anode went away.

Furthermore, even though prelithiated and pre-pulverized particles could still shrink in volume during the discharge process when lithium is extracted out of the anode active material, we have surprisingly found that the resulting anode was capable of maintaining a high capacity for a much longer cycle life compared with conventional anode structures. Presumably, shrinking of prelithiated and pre-pulverized particles did not lead to loss of contacts with conductive additives (e.g., carbon black or fine graphite particles) and the current collector during the charge and discharge cycles.

For a lithium ion battery, according to a preferred embodiment of the present invention, the starting anode active material (in a fine powder or thin-film form) may be selected from the following groups of materials:

(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 µm, more preferably thinner than 1 µm, and most preferably thinner than 100 nm;

(b) The alloys or intermetallic compounds of Si, Ge, Sn, Pb, Sb, Bi, Zn, Al, or Cd, stoichiometric or non-stoichiometric with other elements; and (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

The anode active material for use in the presently invented lithium ion battery preferably includes at least one of silicon (Si), germanium (Ge), and tin (Sn) as an element. This is because silicon, germanium, and tin have a high capability of inserting and extracting lithium, and can reach a high energy density. The next preferred group of elements includes lead (Pb), antimony (Sb), bismuth (Bi), zinc (Zn), aluminum (Al), and cadmium (Cd). When any of these two sets of elements are included as a primary element of an electro-active material (defined as being capable of absorbing and extracting lithium ions in the present context), which is prelithiated and pre-pulverized, the cycling stability of the resulting anode material can be significantly improved. Another preferred class of anode active material include the oxides, carbides, nitrides, sulfides, phosphides, selenides, tellurides, or their mixtures (e.g., co-oxides or composite oxides) of: (a) Si, Ge, Sn, Pb, Sb, Bi, Zn, Al, Fe, or Cd for anode active materials; or (b) Co, Ni, Mn, V, Ti for cathode active materials. They can be readily produced in a thin-film or powder form.

Prelithiation can be accomplished in several different ways. A physical process entails depositing a Li coating on a surface of an anode active material substrate (e.g., thin Si plate or fine Si particles), followed by promoting thermally induced diffusion of Li into the substrate (e.g., into the interior of a Si plate or Si particles). A thin lithium layer can be deposited on the surface of a thin anode material sheet (e.g., Si plate) using a standard thin film process, such as thermal evaporation, electron beam evaporation, sputtering, and laser ablation. A vacuum is used during the deposition process to avoid reactivity between the atomic lithium and molecules of lithium reactive substances such as water, oxygen, and nitrogen. A vacuum of greater than 1 milli-Torr is desirable. When electron beam deposition is used a vacuum of $10^{-4}$ Torr is desired and a vacuum of $10^{-6}$ Torr is preferred to avoid interaction between the electron beam and any residual air molecules.

The evaporative deposition techniques involve the heating of a lithium metal to create a lithium vapor. The lithium metal can be heated by an electron beam or by resistive heating of the lithium metal. The lithium vapor deposits lithium onto a substrate such as a Si plate or Si particles. To promote the deposition of lithium metal the substrate can be cooled or maintained at a temperature lower than the temperature of the lithium vapor. A thickness monitor such as a quartz crystal type monitor can be placed near the substrate to monitor the thickness of the film being deposited. Alternatively, laser ablation and sputtering techniques can be used to promote thin lithium film growth on a substrate. For example, argon ions can be used in the sputtering process to bombard a solid lithium metal target. The bombarding knocks lithium off of the target and deposits it on the surface of a substrate. Laser ablation processes can be used to knock lithium off of a lithium target. The separated lithium is then deposited on a substrate.

A more preferred pre-lithiation process involves electrochemically forcing Li atoms to migrate into the bulk of a Si plate or multiple Si particles under the influence of an electromotive force (emf). In a typical arrangement, again using Si as an example, a thin Si plate or thin Si rod is used as a positive electrode and Li metal sheet or rod as a negative electrode. This is similar to an electro-plating procedure, but, surprisingly, Li atoms are capable of permeating into the bulk of the Si plate or rod (not just being plated on the surface). The surface-coated Li may be dissolved in a solvent and washed away. For electrochemical lithiation of Si particles, the particles may be confined in a porous container (e.g., fine metal mesh) that is permeable to electrolyte, but does not allow solid Si particles to escape. The fine metal mesh serves as a working electrode while a lithium metal rod or sheet serves as a counter electrode.

The aforementioned prelithiation processes are applicable to all the anode active materials discussed in the present specification, not just Si, although Si is used as an example to illustrate the best-mode practice. The anode active material preferably comprises silicon and the prelithiated particles comprise a prelithiated silicon $Li_4Si$, $Li_{4.4}Si$, or $Li_xSi$, wherein numerical x is between 1 and 4.4. These particles were found to be particularly suitable for size-reduction by using ball-milling to produce nano particles. The comminuted, prelithiated fine particles further preferably comprise a prelithiated silicon particle having a size less than 200 nm, more preferably less than 100 nm.

The step of providing an anode active material may comprise providing a doped semiconductor material. Such a doped semiconductor material may be selected from Si or Ge doped with n-type and/or p-type dopants. Commonly used n-type dopants are P, As, and Sb and commonly used p-type dopants are Al, Ga, and In.

The step of comminuting the prelithiated anode active material into fine particles may be accomplished using a wide range of grinding or milling process, such as air jet milling and ball milling, particularly high-intensity ball milling. Preferably, this step is carried out to the extent that the resulting fine particles have an average size less than 10 µm, preferably less than 1 µm, further preferably less than 200 nm, and most preferably <100 nm.

It may be noted that the electro-active material (e.g., pre-lithiated and pre-pulverized Si nano particles) may be coated with a carbonizable coating material (e.g., phenolic resin, poly(furfuryl alcohol), coal tar pitch, or petroleum pitch). The coating can then be carbonized to produce an amorphous carbon or polymeric carbon coating on the surface of these Si particles. Such a conductive surface coating can help maintain a network of electron-conducting paths during repeated charge/discharge cycles and prevent undesirable chemical reactions between Si and electrolyte from happening. Hence, the presently invented method may further comprise a step of coating a surface of the comminuted, prelithiated fine particles with a thin layer of carbon having a thickness less than 1 µm prior to step (d). The thin layer of carbon preferably has a thickness less than 100 nm. Such a thin layer of carbon may be obtained from pyrolization of a polymer, pitch, or organic precursor or obtained by chemical vapor deposition.

In the preparation of an anode, acetylene black (AB), carbon black (CB), or ultra-fine graphite particles may be used as a conductive additive. Conductive additives may comprise an electrically conductive material selected from the group consisting of electro-spun nano fibers, carbonized electro-spun nano fibers, vapor-grown carbon or graphite nano fibers, carbon or graphite whiskers, carbon nano-tubes, nano-scaled graphene platelets, metal nano wires, metal-coated nano wires, carbon-coated nano wires, metal-coated nano fibers, carbon-coated nano fibers, and combinations thereof. A binder material may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. A typical mixing ratio of these ingredients is 80 to 85% by weight for the anode active material, 5 to 15% by weight for the conductive additive, and 5 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

In a preferred embodiment of the present invention, step (d) may comprise combining multiple fine particles of prelithiated anode active material with a conductive additive and/or a binder material, plus a desired amount of another type of anode active materials selected from particles of graphite, hard carbon, soft carbon, meso-carbon micro-bead, surface-modified graphite, carbon-coated graphite, or a combination thereof.

Hence, a lithium ion battery may contain an anode that comprises at least two types of anode active material wherein at least one type of active material is prelithiated (e.g., Si and Sn) and at least one type of active material is not prelithiated (e.g., carbonaceous material, such as graphite, hard carbon, soft carbon, surface-modified graphite, chemically modified graphite, or meso-carbon micro-beads, MCMBs). Prelithiated carbonaceous anode materials are unstable in regular room air. The present invention enable the battery to contain an anode that comprises at least a non-carbon active material possessing an ultra-high lithium absorbing capacity (e.g., Si that exhibits a specific capacity up to 4,200 mAh/g). The battery comprises an anode that contains an excess amount of lithium (disposed inside a non-carbon anode active material, not on its surface) to compensate for the formation of SEI layers, in addition to providing enough lithium to intercalate into (or form a compound with) a cathode active material.

The present invention allows the excess amount of lithium to be stored in high-capacity anode active materials (there is no need to make use of the full capacity of Si, for instance). The capacity limitation is on the cathode side, rather than the anode side. The present approach obviates the need for the cathode to supply the needed lithium, thereby further reducing the needed initial weight of the cathode or increasing the cathode weight that can be incorporated in a cell. This strategy can increase the overall capacity of a lithium ion battery by another 10%-20%.

The positive electrode active material may be selected from a wide variety of oxides, such as lithium-containing nickel oxide, lithium-containing cobalt oxide, lithium-containing nickel-cobalt oxide, lithium-containing vanadium oxide, lithium iron phosphate, lithium manganese phosphate, lithium manganese-iron phosphate, and other lithium metal (or mixed metals) phosphate. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate because these oxides provide a relatively high cell voltage and relatively good cycling stability.

Lithium cobalt oxide ($LiCoO_2$) is one of the most important cathode materials used in lithium-ion secondary batteries. $LiCoO_2$ and other similar lithium transition metal oxides, such as lithium manganese oxide, lithium nickel oxide, and lithium vanadium oxide, can be prepared by various methods using different lithium and transition metal sources. In general, bulk transition metal oxides are prepared by solid-state reactions, which involve repeated heat processes at high temperatures. Such processes generally afford the thermodynamically more stable phases and in general, microcrystalline materials are obtained. Lower temperatures and mild processing conditions may be used for several methods, such as co-precipitation, sol-gel process with/without template, synthesis by precursor, ion-exchange reaction and hydrothermal. These methods also result in particles with better control of morphology and smaller size. Other methods include flame spray pyrolysis, dehydro-freezing evaporation, supercritical dehydration, supersonic hydrothermal synthesis, and ultrasonic processing.

As an example, a process for producing lithium-cobalt oxide my include (a) mixing cobalt oxide having an average particle size of not more than 0.1 μm, with a lithium compound; and (b) calcining the obtained mixture at a temperature of 500 to 850° C. As compared to the conventional processes that begin with larger cobalt oxide particles (e.g., diameter>10 μm), such a process is advantageous in that lithium-cobalt oxide particles (1) can be produced with a short calcination time, (2) have a narrow particle size distribution, and (3) have a uniform small particle size.

The flame-spray pyrolysis method may include the steps of: (a) spraying minute droplets containing a solution of dissolved lithium salt and cobalt salt at room temperature; (b) atomizing the minute droplets through rapid expansion into a high temperature environment generated by combusting oxygen and hydrogen; (c) decomposing and oxidizing the atomized minute droplets thermally at high temperature to produce nano-sized oxides in gaseous phase; and (d) collecting the produced nano-sized composite oxides particles.

Lithium iron phosphate $LiFePO_4$ is a promising candidate of cathode material for lithium-ion batteries. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. A major drawback with this material is that it has very low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. This major problem may be overcome by using a nano-scaled powder (to reduce the Li ion diffusion path and electron transport path distance) and doping the powder with a transition metal. Lithium iron phosphate ($LiFePO_4$) nano particles may be prepared by ball milling of conventional micron-sized particles, which may be prepared by a solid state reaction using $LiOH.H_2O$, $(CH_3COO)_2Fe$, and $NH_4H_2PO_4$ as raw materials. Additionally, $Li_{1.3}Al_{0.3}Ti_{1.7}(PO_4)_3$ materials, as an example of lithium mixed-metal phosphate, may be successfully prepared by the solution deposition using lithium acetate, aluminum nitrate, ammonium dihydrogen phosphate and titanium butoxide as starting materials. The resulting material may be ball-milled to sub-micron or nanometer scales. This is but one example of a host of complex metal phosphate-based cathode materials.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

Figure 3:
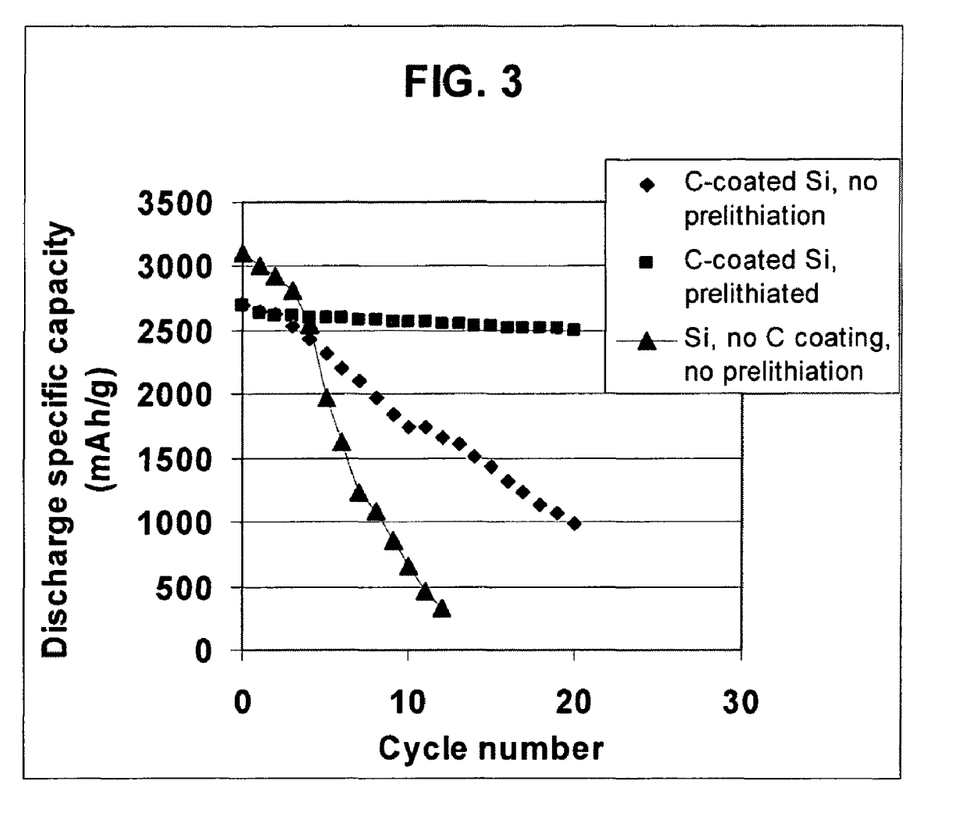
FIG. 3 Specific discharge capacities of prelithiated, pre-pulverized Si particles with carbon coating and those of non-prelithiated Si particles.

Summarized in FIG. 3 are the results of a study that illustrates the impressive advantages of the presently invented anode technology. The sample was prepared by using the prelithiated Si particles coated with amorphous carbon (13% after carbonization of phenolic resin) and bonded by PVDF as the working electrode and lightly lithium-plated Cu foil as the counter electrode and reference electrode. A specific discharge capacity as high as 2,500 mAh per gram of (Si+C) was maintained after 20 cycles. By contrast, non-prelithiated Si particles, with or without a carbon coating, exhibit a high initial capacity, but the capacity rapidly fades away as the number of repeated charge/discharge cycles increases.

Figure 4:
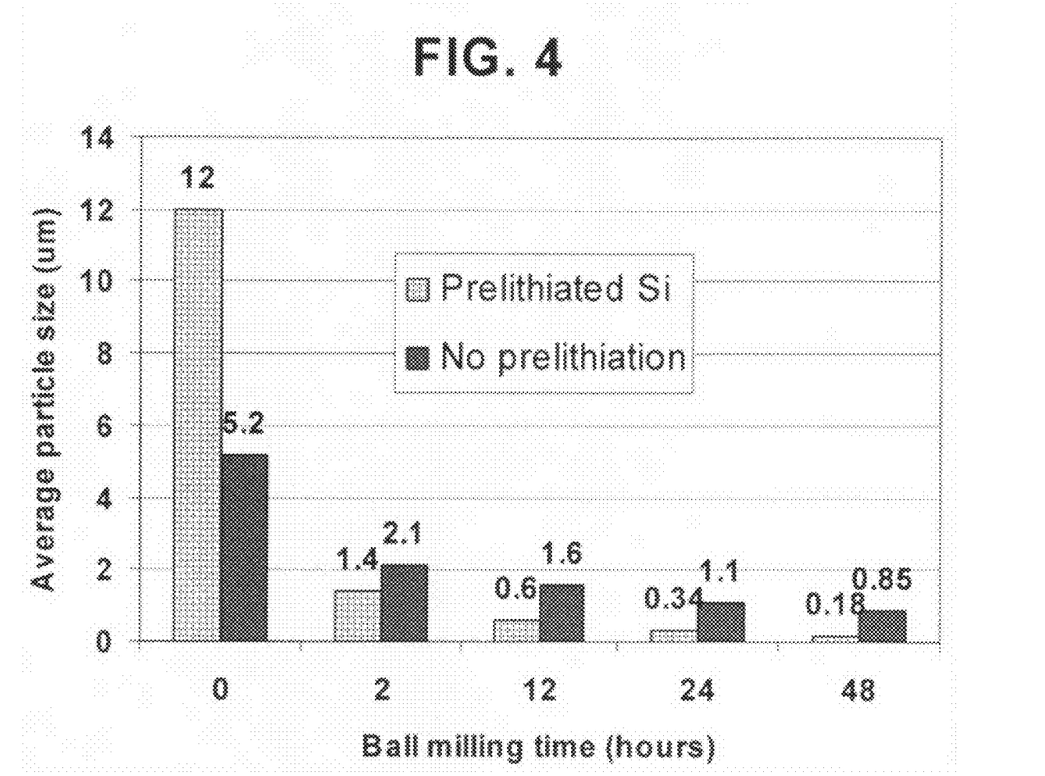
FIG. 4 Ball milling results of prelithiated and non-prelithiated Si particles.

FIG. 4 shows the results of ball-milling prelithiated and non-prelithiated Si particles. Clearly, prelithiated particles can be more easily reduced to sub-micron scales. This is a highly surprising, yet desirable result considering the fact that, in general, nano particles have been difficult and expensive to produce. The present invention unexpectedly discovers an efficient way to cost-effectively produce nano particles.

In summary, the present invention provides an innovative, versatile platform materials technology that enables the design and manufacture of superior anode materials for lithium ion batteries. This new technology has the following significant advantages:
(a) Prelithiated particles can be much more readily converted into nano-scaled particles as compared to their non-lithiated counterparts. In general, the production of nano particles is known to be slow and expensive. Prelithiation brings the micron-scaled particles to the state of high brittleness so that they can be easily comminuted into nano-scaled particles rapidly and cost-effectively. Nano particles also mean a shorter distance for lithium ions to penetrate in and out of the particles, resulting in a better rate capacity for the battery.
(b) Pre-pulverized, prelithiated particles that are already nano-scaled are no longer brittle and, for the most part, no longer pulverizable in an anode when the battery undergoes repeated charges and recharges. The issue of having undesired particle pulverization has now been overcome.
(c) Even though prelithiated particles could shrink in volume during the discharge process when lithium is extracted out of the anode active material, we have surprisingly found that shrinking of prelithiated and pre-pulverized particles did not lead to loss of contacts with conductive additives (e.g., carbon black or fine graphite particles) and the current collector during the charge and discharge cycles. Hence, the anode maintains a high capacity for a much longer cycle life. In contrast, in the conventional Li-ion battery electrodes, although conductive additives could form a condition of percolation where the particles contact one another to form a network of electron-conducting paths, they are easily broken when the particles expand or shrink during the Li ion insertion or extraction steps.
(d) The present approach obviates the need for the cathode to supply the needed lithium, thereby further increasing the cathode capacity and avoiding the associated shortcomings.

The invention claimed is:

1. A method of producing a lithium-ion battery anode comprising:
    A) Providing an anode active material; wherein said anode active material is selected from the group consisting of:
        a) silicon (Si), germanium (Ge), tin (Sn), lead (Pb), antimony (Sb), bismuth (Bi), zinc (Zn), aluminum (Al), and cadmium (Cd);
        b) alloys or intermetallic compounds of Si, Ge, Sn, Pb, Sb, Bi, Zn, Al, or Cd with other elements, wherein said alloys or compounds are stoichiometric or non-stoichiometric;
        c) oxides, carbides, nitrides, sulfides, phosphides, selenides, and tellurides of Si, Ge, Sn, Pb, Sb, Bi, Zn, Al, Fe, or Cd, and their mixtures or composites; and
        d) combinations thereof;
    B) Intercalating or absorbing a desired amount of lithium into said anode active material to produce a prelithiated anode active material;
    C) Comminuting said prelithiated anode active material into fine particles with an average size less than 10 μm; and
    D) Combining multiple fine particles of said prelithiated anode active material with a conductive additive and/or a binder material to form said anode.

2. The method of claim 1 wherein said comminuted, prelithiated fine particles have an average particle size less than 1 μm.

3. The method of claim 1 wherein said comminuted, prelithiated fine particles have an average particle size less than 200 nm.

4. The method of claim 1 wherein said comminuted, prelithiated fine particles have an average particle size less than 100 nm.

5. The method of claim 1 wherein said prelithiated anode active material is produced electrochemically.

6. The method of claim 1 wherein said anode active material is in a fine powder form with an average particle size less than 10 μm; in a thin film form with a thickness less than 10 μm; or in a thin rod form with a transverse dimension less than 10 μm.

7. The method of claim 1 wherein said anode active material is in a fine powder form with an average particle size less than 5 gm.

8. The method of claim 1 wherein said anode active material comprises silicon and said prelithiated particles comprise a prelithiated silicon $Li_4Si$, $Li_{4.4}Si$, or $Li_xSi$, wherein numerical x is between 1 and 4.4.

9. The method of claim 1 wherein said comminuted, prelithiated fine particles comprise a prelithiated silicon particle having a size less than 200 nm.

10. The method of claim 1 wherein said step of providing an anode active material comprises providing a doped semiconductor material.

11. The method of claim 1 wherein said step of providing an anode active material comprises providing a doped semiconductor material selected from Si or Ge doped with n-type and/or p-type dopants.

12. The method of claim 1 further comprising a step of coating a surface of said comminuted, prelithiated fine particles with a thin layer of carbon having a thickness less than 1 μm prior to step D).

13. The method of claim 12 wherein said thin layer of carbon has a thickness less than 100 nm.

14. The method of claim 12 wherein said thin layer of carbon is obtained from pyrolization of a polymer, pitch, or organic precursor or obtained by chemical vapor deposition.

15. The method of claim 1 wherein step (d) comprises combining multiple fine particles of said prelithiated anode active material with a conductive additive and/or a binder material, plus a desired amount of another anode active material selected from particles of graphite, hard carbon, soft carbon, meso-carbon micro-bead, surface-modified graphite, carbon-coated graphite, or a combination thereof.

16. The method of claim 1 wherein said conductive additive comprise an electrically conductive material selected from the group consisting of electro-spun nano fibers, carbonized electro-spun nano fibers, vapor-grown carbon or graphite nano fibers, carbon or graphite whiskers, carbon nano-tubes, nano-scaled graphene platelets, metal nano wires, metal-coated nano wires, carbon-coated nano wires, metal-coated nano fibers, carbon-coated nano fibers, and combinations thereof.

17. A method of producing a lithium-ion battery comprising (A) preparing an anode using a method as defined in claim 1; and (B) combining said anode with a cathode, separator, and electrolyte to form said battery.

18. A method of producing a lithium-ion battery comprising (A) preparing an anode from pre-lithiated and pre-pulverized particles of claim 1; and (B) combining said anode with a cathode, separator, and electrolyte to form said battery.

19. The method as defined in claim 18, wherein said pre-lithiated and pre-pulverized particles have a size small than 200 nm.

* * * * *